United States Patent
Friedl

(10) Patent No.: US 7,043,003 B1
(45) Date of Patent: May 9, 2006

(54) DEVICE AND METHOD FOR IMPROVING THE LOAD DISTRIBUTION IN A SIGNALING NETWORK

(75) Inventor: Claus Friedl, Tuerkenfeld (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/030,375

(22) PCT Filed: Apr. 17, 2000

(86) PCT No.: PCT/DE00/01203

§ 371 (c)(1),
(2), (4) Date: Oct. 22, 2001

(87) PCT Pub. No.: WO00/64195

PCT Pub. Date: Oct. 26, 2000

(30) Foreign Application Priority Data

Apr. 20, 1999 (DE) ................. 199 17 814

(51) Int. Cl.
H04M 7/00 (2006.01)
H04Q 3/00 (2006.01)
H04Q 11/00 (2006.01)

(52) U.S. Cl. ............ 379/230; 370/236; 370/385; 370/395.41; 370/468; 370/524; 379/221.07

(58) Field of Classification Search ............... 370/229, 370/230, 235, 236, 385, 395.1, 395.21, 395.41, 370/468, 524; 379/221.07, 229, 230
See application file for complete search history.

(56) References Cited

U.S. PATENT DOCUMENTS

| | | | | |
|---|---|---|---|---|
| 5,280,470 A * | 1/1994 | Buhrke et al. | ............ | 370/232 |
| 5,574,724 A * | 11/1996 | Bales et al. | ............ | 370/410 |
| 5,579,301 A * | 11/1996 | Ganson et al. | ............ | 370/229 |
| 5,615,213 A * | 3/1997 | Griefer | ............ | 370/412 |
| 5,673,262 A | 9/1997 | Shimizu | ............ | 370/385 |
| 5,905,724 A * | 5/1999 | Carson et al. | ............ | 370/385 |
| 5,940,492 A * | 8/1999 | Galloway et al. | ............ | 379/230 |
| 5,949,871 A * | 9/1999 | Kabay et al. | ............ | 379/229 |
| 5,978,387 A * | 11/1999 | Sherman | ............ | 370/468 |
| 6,078,584 A * | 6/2000 | Mottishaw et al. | ............ | 370/385 |
| 6,282,197 B1 * | 8/2001 | Takahashi et al. | ............ | 370/395.1 |
| 6,690,787 B1 * | 2/2004 | Gradischnig | ............ | 379/229 |
| 6,724,996 B1 * | 4/2004 | Ballintine et al. | ............ | 398/98 |
| 6,970,467 B1 * | 11/2005 | Sunaga et al. | ............ | 370/395.1 |

FOREIGN PATENT DOCUMENTS

| | | |
|---|---|---|
| EP | 0 792 074 A2 | 8/1997 |
| EP | 0 915 625 A1 | 5/1999 |

OTHER PUBLICATIONS

XP-000419692 "A Novel Link Set Dimensioning Procedure for Networks Supporting the Load Splitting Link Seletion Algorithm", Wang, pp. 1280-1287.
XP-000704449 "ATM-Based SS7 for Narrowband Networks—A Step Towards Narrowband-Broadband Convergence" Franz et al.

* cited by examiner

Primary Examiner—Harry S. Hong
(74) Attorney, Agent, or Firm—Bell, Boyd & Lloyd LLC

(57) ABSTRACT

The invention relates to an apparatus and a method for improving the load distribution in a signaling network having a large number of signaling nodes (A, B) and a large number of signaling channels (L0, L1, L2, L3), with overloading in the signaling network being reliably prevented by taking account of a respective individual bandwidth ($EBB_0$ to $EBB_3$).

12 Claims, 1 Drawing Sheet

DEVICE AND METHOD FOR IMPROVING THE LOAD DISTRIBUTION IN A SIGNALING NETWORK

Figure 1:
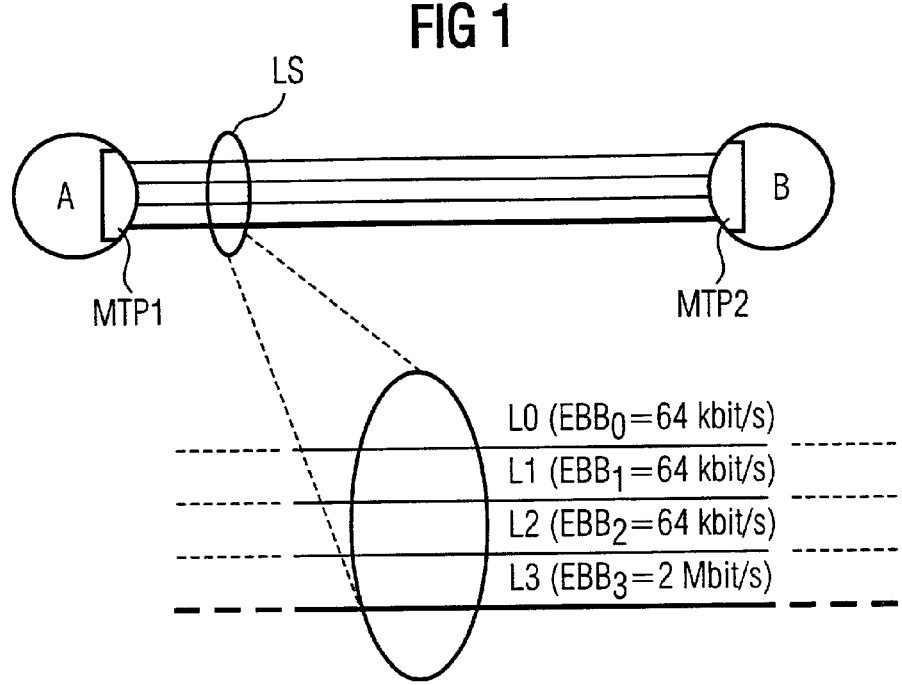

The present invention relates to an apparatus and a method for improving the load distribution in a signaling network and, in particular, to what is referred to as a load sharing method, which results in signaling data being distributed uniformly in a digital signaling network.

Communication nets or networks generally connect two subscriber terminals to one another via a number of line sections and switching devices in order to interchange messages (for example voice, data, text and/or images). Control information and signaling messages can in this case be transmitted between the switching centers, for connection control and when using service features. Digital, computer-controlled communication networks, in particular, offer a considerably greater performance scope in comparison to analog communication networks, for which reason a new, powerful signaling system has been introduced in digital, computer-controlled communication networks.

The ITU (International Telecommunication Union) has thus specified the central signaling system No. 7 (CCS7), which is optimized for use in digital nets or networks.

In contrast to the previously normal channel-based signaling, the signaling messages in CCS7 are passed via separate signaling paths or signaling channels (links). A large number of such signaling channels (links) in this case form what is referred to as a signaling set (link set), with a signaling set (link set) having a maximum of 16 signaling channels (links). A signaling channel transports the signaling messages for a number of user channels (trunks).

The signaling channels or signaling links (links or link sets) in CCS7 connect what are referred to as message transfer parts (MTP) in a communication network. The message transfer parts and the signaling channels thus form an autonomous signaling network, which is superimposed on a user channel network.

The signaling end points are in this case the sources and sinks of the signaling traffic and are provided in a communication network primarily by switching centers or signaling nodes. In this case, the message transfer parts (MTP) transmit received signaling messages on the basis of a destination address (destination point code, DPC) to another message transfer part (MTP). No switching processing of the signaling messages is generally carried out in a message transfer part (MTP). A message transfer part may be integrated in a signaling end point (for example a switching center), or may form an autonomous signaling node in the signaling network. One or more levels of message transfer parts (MTP) may be possible depending on the size of the signaling network.

All the signaling points in a predetermined signaling network are identified within a numbering plan, which is defined by the ITU, by means, for example, of a 14-point code (PC) and can thus be addressed specifically in a signaling message. In CCS7, such a signaling message is provided by the message signaling unit MSU).

In addition to a destination address (destination point code DPC) and a source address (origin point code OPC), a speech circuit address (circuit identification code CIC) is essentially also stored in these signaling messages, which are transmitted in the signaling network, and message signaling units (MSU). This voice circuit address (CIC) has 12 bits according to the ITU Standard, with the 4 least-significant bits being referred to as a signaling path selection field (signaling link selection field, SLS). According to the ITU, the various voice signaling messages (MSU) are assigned predetermined signaling paths via this signaling path selection field (SLS values).

In a conventional signaling network, the signaling messages (MSU) to be transmitted are distributed uniformly between the available signaling channels or active links in a signaling set of its link set) thus allowing the load to be distributed uniformly in the signaling network.

Such a conventional load distribution method is known from the reference "Wang J. L: A Novel Link Set Dimensioning Procedure for Networks supporting the Load Splitting Link Selection Algorithm, Proceedings to the Infocom '93 Annual Joint Conference of the computer and communications societies Conference Proceedings Vol. 12, Mar. 28, 1993–Apr. 1, 1993, pages 1280–1287". This proposes a novel signaling set dimensioning method which is based on the "load splitting link selection" algorithm, in which randomly produced bit patterns are used for selecting a signaling channel. The capacity and available individual bandwidth in these signaling channels are, however, regarded as being essentially equivalent in this method. In order to improve the load distribution, particularly in cases where the increase in the total capacity in the signaling set (link set) is inadequate despite the addition of additional signaling channels, this document proposes a theorem for creating a special set of equivalent signaling channels, by means of which the actually available total capacity is used optimally, especially when using the "load splitting link selection" algorithm.

Particularly when using novel transmission techniques such as packet switching, ATM, IP etc., and a result of the use of novel transmission media, such as glass fiber cables, signaling configurations have increasingly arisen in which signaling channels occur with different bandwidths, that is to say transmission rates for the signaling messages (MSU).

Such a method and an apparatus for providing load distribution in a signaling network having a large number of signaling nodes for distribution of signaling messages, and a large number of signaling channels for transmitting signaling messages, are known from the reference "Franz R. et al.: ATM-Based SS7 for Narrowband Networks—A step forward towards Narrowband-Broadband Convergence, Proceedings of ISS '97 International Switching Symposium, Toronto, Calif., Sep. 21–26, 1997, pages 3–10", in which the signaling messages are transmitted for the first time with at least one first and one second individual bandwidth via a common signaling set or link set. The second individual bandwidth, as part of a broadband signaling system, is in this case considerably wider than the first individual bandwidth, which in principle represents a narrowband signaling system. In consequence, a narrowband signaling system is for the first time proposed, by means of which both narrowband and broadband signaling can be carried out.

When using a conventional method and an associated apparatus for load distribution in the signaling network, this means that the signaling channel having the narrowest bandwidth (narrowband signaling) governs the maximum usable transmission rate per signaling set (link set). If, in consequence, the transmission rate for signaling messages to be transmitted is increased further, then this itself results in overloading on the signaling channel with the narrowest bandwidth when using conventional load distribution, while the signaling channels with the wider bandwidth (Broadband signaling) are scarcely loaded.

The invention is thus based on the object of providing an apparatus and a method for improving the load distribution in a signaling network, in which overloading of signaling channels is reliably prevented.

According to the invention, this object is achieved with regard to the method by the measures in patent claim 1, and with regard to the apparatus by the features in patent claim 7.

A respective individual bandwidth is preferably determined, and is subsequently evaluated, for each signaling channel available at a signaling node. Finally, the signaling messages to be distributed are distributed between the available signaling channels as a function of the respective evaluation result. Thus, even in the case of signaling networks which use signaling channels with different bandwidths, this results in optimum utilization of the respective signaling paths. Overloading of signaling channels or signaling sets is thus reliably prevented.

During the evaluation process, a relative bandwidth value is preferably determined for each available signaling channel with respect to the bandwidths of the available signaling channels, and the signaling messages to be transmitted are distributed in such a manner that a signaling channel having a wide individual bandwidth transmits at least the same number of signaling messages as a signaling channel having a narrow individual bandwidth. This allows widely differing calculation forms to be used for determining the relative bandwidth value, in which case correct or optimum assignment of signaling messages to those signaling channels which are not yet fully loaded can always be provided.

Furthermore, in the case of the method and the apparatus according to the invention for improving the load distribution in a signaling network, each signaling channel can be assigned at least one signaling message to be transmitted, thus allowing improved maintenance at the signaling network by means of the network operator, at the expense of optimum load distribution. This in consequence considerably simplifies the capability to check the signaling channels, which are thus at least partially loaded at all times.

Advantageous refinements of the invention are characterized in the further dependent claims.

Figure 2:
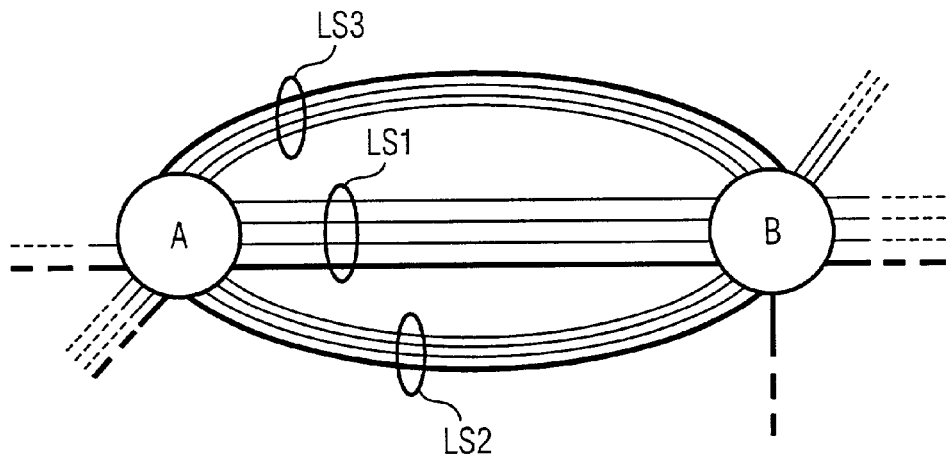

The invention will be described in more detail in the following text using the exemplary embodiments and with reference to the drawings, in which:

FIG. 1 shows a schematic view of two signaling nodes with signaling channels having different bandwidths; and FIG. 2 shows a schematic view of a part of a signaling network having a large number of signaling sets.

FIG. 1 shows a schematic view of two signaling nodes A and B, which are connected to one another via a signaling set LS (link set). The signaling nodes A and B each represent, for example, a switching center, and have a message transfer part MTP1 and MTP2 (message transfer point) for transmitting signaling messages in the form of message signaling units (MSU). According to FIG. 1, the signaling set LS comprises a signaling channel L0 with an individual bandwidth $EBB_0$ of 64 kilobits per second. In the same way, the further signaling channels L1 and L2 also have an individual bandwidth of $EBB_1=EBB_2=64$ kilobits per second. In contrast, a signaling channel L3 has a high transmission rate with an individual bandwidth $EBB_3$ of 2 Megabits per second. Such a signaling set LS occurs, for example, when a further signaling line with a high data rate (for example a glass fiber cable) is added to an already existing signaling line.

On the basis of the signaling path selection field (SLS field) described initially in a message signaling unit (MSU), of the signaling message, the signaling channels L0 to L3 can be allocated or selected uniquely. In contrast to conventional selection methods, in which the signaling channels are selected only quantitatively, the apparatus according to the invention and the method according to the invention mean that a qualitative selection or allocation of signaling channels is carried out for the signaling messages to be transmitted as a function of a respective individual bandwidth $EBB_x$ of the various signaling channels.

The method and the apparatus for improving the load distribution in a signaling network and, in particular, the load distribution in the signaling set LS are described in detail in the following text.

First Exemplary Embodiment

In order to assign the signaling messages to be transmitted to the respective available signaling channels L0, L1, L2 and L3, the message transfer part MTP1 has what is referred to as a load distribution key (load sharing key), which essentially comprises a table of signaling path selection field values (SLS values) and associated signaling channels (links). In the previous method, the distribution process was carried out in such a way that as far as possible an equal number of SLS values are allocated to each available signaling channel. If one considers this table and this load distribution key, then this results in a statement of the load distribution in the individual signaling channels and the higher-level signaling sets LS, which is based on a purely quantitative analysis of the signaling channels. However, the essential feature for the present invention is the fact that qualitative allocation is carried out, furthermore, in addition to this quantitative allocation of SLS values and signaling channels. To be more precise, the message transfer part MTP1 furthermore has a determination device for determining a respective individual bandwidth $EBB_x$ for the available signaling channels Lx, where x=0 to 3. This determination device, which is not illustrated, in consequence records a respective individual bandwidth $EBB_0$, $EBB_1$ and $EBB_2$ of 64 kilobits per second for the signaling channels L0, L1 and L2. In contrast, this determination device records an individual bandwidth $EBB_3$ of 2 Megabits per second for the signaling channel L3. These determined individual bandwidths are stored in a database, and are linked to the load distribution key (load sharing key). To be more precise, a qualitative assessment is carried out of the individual signaling channels as a function of the respectively determined individual bandwidths $EBB_0$ to $EBB_3$. If these respective individual bandwidths are evaluated skillfully, the load distribution can be optimized for the individual signaling channels so as to reliably prevent overloading in individual signaling channels.

A number Z(x) of the signaling path selection values (SLS values) which are transmitted via a signaling channel x (where x=0 to 3) are preferably determined as follows:

$$Z(x)=16 \times EBB_x/GBB \tag{1}$$

where Z(x) represents the number of SLS values which are transmitted via the signaling channel x, $EBB_x$ represents the individual bandwidth of the respective signaling channel x, and GBB represents the sum of the individual bandwidths for all the available signaling channels in the signaling set LS.

The multiplication of the quotient $EBB_x/GBB$ in the equation (1) quoted above with the value 16 is based on the figure of 4 bits specified as a fixed value for the world market in the ITU standard for the SLS value in the CCS7 signaling network, as a result of which a maximum of 16 different SLS values can be represented. A different value range of the SLS values would accordingly result in a multiplier other than 16.

If the individual bandwidths are evaluated in accordance with the equation described above, this thus results in the overall bandwidth GBB having a value of 3×64 kilobits+2 Megabits per second=35×64 kilobits per second. The values for the number of SLS values are thus:

$Z(0)=16\times1/35$ $Z(1)=16\times1/35$ $Z(2)=16\times1/35$ and $Z(3)=16\times32/35$ Since only rounded integers can be used for the number of SLS values, this would result in all 16 SLS values being distributed to the signaling channel L3. In consequence, the optimum load distribution in this first exemplary embodiment would lead to all the signaling messages being transmitted in the signaling channel L3.

However, in certain cases, this may be disadvantageous for the signaling network since, for example, redundant signaling lines are not used. Each signaling channel L0 to L3 is thus preferably assigned at least one signaling message to be transmitted, which furthermore makes it possible to improve the maintenance and capability to test the signaling paths. In addition, if one of the signaling channels (for example L3) fails, it is possible to switch particularly easily and quickly to the signaling channels L0 to L2 which are still available.

Second Exemplary Embodiment

According to a second exemplary embodiment, which is not illustrated, the signaling set LS comprises only two signaling channels with an individual bandwidth of 64 kilobits per second and 256 kilobits per second. This is the situation, for example, when there is already an E1 transmission path at 64 kilobits per second in the broadband CCS7 and, owing to an increase in the amount of traffic, the network operator now wishes to set up an additional STM1 optical transmission path from the signaling node A to the signaling node B, which, for example, contains a signaling channel with a bandwidth of 256 kilobits per second. The existing CCS7 signaling channel at 64 kilobits per second is intended to be retained in this case, for redundancy reasons. When using such a signaling set, the use of the equation described above results in the load distribution as described below for the number of SLS values.

$Z(0)=16\times64/320=3\rightarrow$ e.g. $SLS=0, 1, 2$ $Z(1)=16\times256/320=13\rightarrow$ e.g. $SLS=3, 4, 5, 6, 7, 8, 9, 10, 11, 12, 13, 14, 15.$ This means that the signaling channel L0 transmits 3/16 of the load, and the signaling channel L1 transmits 13/16 of the load. In consequence, the signaling channel L1 is loaded by 1/16 more than the relative figure equivalent to its maximum bandwidth. In contrast to the conventional quantitative assignment of the signaling messages to be transmitted, 16/13×256 kilobits per second, that is to say 315 kilobits per second, can be used with this method with the qualitative assignment process according to the invention and with a total installed bandwidth GBB of 320 kilobits per second, and this corresponds to an increase of 146 percent.

Third Exemplary Embodiment

In the first and second exemplary embodiments, the improvement in the load distribution was determined on the basis of an overall bandwidth GBB of subsequent ratio of formation in the ratio of the respective individual bandwidths. However, the invention is not restricted to this and also covers, for example, direct ratio of formation in the ratio of the respective individual bandwidths. In consequence, for example, a narrowest or widest individual bandwidth EBBmin/EBBmax can be determined in the message transfer path MTP1 with the quotient then being formed between this narrowest and widest individual bandwidth and the respective individual bandwidth to be considered.

If, as shown by way of example in FIG. 1, the signaling channel L0 is used as the reference value for the narrowest individual bandwidth EBBmin (64 kilobits per second), then this results in the following quotients for the respective signaling channels:

$L0=1$ $L1=1$ $L2=1$ $L3=32.$

If, on the other hand, the widest individual bandwidth EBBmax of the signaling channel L3 (2 Megabits per second) is used as the reference value, this results in the following values for the quotients of the respective individual bandwidths:

$L0=1/32$ $L1=1/32$ $L2=1/32$ $L3=1$

In this case as well, the load distribution in a signaling network can be improved by evaluating the respective relative individual bandwidths (quotients).

According to a modification of this exemplary embodiment, as an alternative, the determined individual bandwidths of the available signaling channels L0 to L3 can also be multiplied, in which case a root can be formed in a subsequent step in order to produce the ratio between these individual bandwidths. The multiplication process is preferably carried out only for the individual bandwidths of two signaling channels, since extraordinarily large numerical values would occur otherwise.

However, the invention is not restricted to the evaluation methods described above and, in fact, covers all other evaluation methods in which the individual bandwidths of the signaling channels can be represented as their ratio to one another.

Fourth Exemplary Embodiment

FIG. 2 shows a schematic view of a part of a signaling network according to a fourth exemplary embodiment, with a large number of signaling sets LS1, LS2 and LS3 being arranged between the signaling nodes A and B. A configuration such as this occurs, for example, when main traffic nodes in a signaling network need to be connected to one another, and it is necessary to process an extraordinarily high level of signaling traffic.

Since, as has already been described above, the signaling path selection fields (SLS fields) have only 4 bits, and in consequence can represent only 16 SLS values, one signaling set LS has a maximum of 16 signaling channels. Further signaling sets LS2 and LS3 are thus defined for unique association, so that the capacity for transmitting signaling messages can be multiplied. This equally results in a considerably more complex representation for the mode of distribution key (load sharing key) which, in consequence, comprises a large number of tables for the individual signaling sets LS1, LS2 and LS3, with the table for one signaling set LS associating the number of SLS values with the respective signaling channels available in that signaling set. In the same way as that described above, this table is associated with a database which includes the respective individual bandwidths of the available and active signaling channels. This also results in a qualitative association for the respective signaling channels for a signaling network having a number of signaling sets LS1, LS2 and LS3, thus ensuring optimum load distribution even when using signaling channels having different bandwidths, and reliably preventing the individual signaling channels or signaling sets from being overloaded.

The invention has been described above with reference to a CCS7 signaling network. However, it is not restricted to this and can also be applied to other signaling networks in which signaling channels in each case have different bandwidths.

The invention claimed is:

1. A method for improving the load distribution in a signaling network having
   a large number of signaling nodes (A, B) for distributing signaling messages, and
   a large number of signaling channels (L0, L1, L2, L3) for transmitting signaling messages, having at least one first and one second individual bandwidth ($EBB_0$ to $EBB_3$), with the second individual bandwidth ($EBB_3$) being wider than the first individual bandwidth ($EBB_0$ to $EBB_2$);
   characterized by the following steps:
   a) determining a respective available individual bandwidth ($EBB_0$ to $EBB_3$) for the signaling channels (L0 to L3) available at a signaling node (A);
   b) evaluating the determined individual bandwidths ($EBB_0$ to $EBB_3$); and
   c) assigning the signaling messages to be transmitted to the available signaling channels as a function of the result of the evaluation in step b).

2. The method as claimed in patent claim 1, characterized in that, during the evaluation process,
   in step b), for the signaling channels (L0 to L3) a relative bandwidth value is in each case determined with reference to the signaling channels available at a signaling node; and
   in step c), the assignment of the signaling messages to be transmitted is carried out in such a manner that a signaling channel (L3) having a second individual bandwidth ($EBB_3$) transmits at least the same number of signaling messages as a signaling channel (L0) having a first individual bandwidth ($EBB_0$).

3. The method as claimed in patent claim 1 or 2, characterized in that, in step b),
   b1) a total sum of the individual bandwidths ($EBB_0$ to $EBB_3$) of the signaling channels (L0 to L3) available at a signaling node is determined; and
   b2) a quotient of the respective individual bandwidth ($EEB_0$ to $EBB_3$) and of the determined total sum is in each case formed for the signaling channels (L0 to L3).

4. The method as claimed in patent claim 1 or 2, characterized in that, in step b),
   b1) a narrowest/widest individual bandwidth ($EBB_0$/$EBB_3$) of the at least first and second individual bandwidths ($EBB_0$ to $EBB_3$) is determined, and
   b2) a quotient of the respective individual bandwidth ($EBB_0$ to $EBB_3$) and of the determined narrowest/widest individual bandwidth ($EBB_0$/$EBB_3$) is in each case formed for the signaling channels available at a signaling node.

5. The method as claimed in patent claim 1 or 2, characterized in that, in step b),
   b1) a product of the respective available individual bandwidths ($EBB_0$ to $EBB_3$) and a predetermined individual bandwidth is in each case determined for the signaling channels (L0 to L3) available at a signaling node, and
   b2) a root of the respectively determined products is in each case formed for the signaling channels (L0 to L3) available at a signaling node.

6. The method as claimed in patent claims 1 to 5, characterized in that at least one signaling message which is to be transmitted is in each case assigned to the signaling channel available at a signaling node.

7. An apparatus for improving the load distribution in a signaling network having
   a large number of signaling nodes (A, B) for distributing signaling messages, and
   a large number of signaling channels (L0 to L3) for transmitting signaling messages, having at least one first and one second individual bandwidth ($EBB_0$ to $EBB_3$), with the second individual bandwidth ($EBB_3$) being wider than the first individual bandwidth ($EBB_0$ to
   characterized by
   a determination device for determining a respectively available individual bandwidth ($EBB_0$ to $EBB_3$) for the signaling channels (L0 to L3) available at a signaling node (A, B);
   an evaluation device for evaluating the determined individual bandwidths ($EBB_0$ to $EBB_3$); and
   an assignment device for assigning the signaling messages to be transmitted to the available signaling channels (L0 to L3) as a function of the result from the evaluation device.

8. The apparatus as claimed in patent claim 7, characterized in that the evaluation device in each case determines a relative bandwidth value for the signaling channels (L0 to L3) with respect to the signaling channels available at a signaling node, and the assignment device carries out the assignment of the signaling messages to be transmitted in such a manner that a signaling channel having a second individual bandwidth ($EBB_3$) transmits at least the same number of signaling messages as a signaling channel ($EBB_0$) having a first individual bandwidth.

9. The apparatus as claimed in patent claim 1 or 2, characterized in that the evaluation device in each case determines a total sum of the individual bandwidths of the signaling channels (L0 to L3) available at a signaling node, and forms a quotient from the respective individual bandwidth and the determined total sum for each of the signaling channels (L0 to L3).

10. The apparatus as claimed in patent claim 7 or 8, characterized in that the evaluation device determines a narrowest/widest individual bandwidth ($EBB_3$/$EBB_0$), of the at least one first and one second individual bandwidth and forms a quotient from the respective individual bandwidth of a signaling channel (L0 to L3) and of the determined narrowest/widest individual bandwidth for each of the signaling channels available at a signaling node.

11. The apparatus as claimed in patent claim 7 or 8, characterized in that the evaluation device determines a product of the available individual bandwidths with a predetermined individual bandwidth for each of the signaling channels (L0 to L3) available at a signaling node, and forms a root of the respectively determined products for each of the signaling channels available at a signaling node.

12. The apparatus as claimed in one of patent claims 7 to 11, characterized in that the assignment device assigns at least one signaling message which is to be transmitted to the signaling channels (L0 to L3) available at a signaling node (A, B).

* * * * *